United States Patent [19]
Francioni et al.

[11] Patent Number: 5,168,163
[45] Date of Patent: Dec. 1, 1992

[54] METHOD AND APPARATUS FOR DETECTING THE POSITIONS OF ARTICLES TRANSPORTED ON A CONVEYOR, PARTICULARLY FOR AUTOMATIC PACKAGING PLANTS

[75] Inventors: Renzo Francioni, Prato Sesia; Duilio Pavese, Borgosesia, both of Italy

[73] Assignee: Cavanna S.p.A., Turin, Italy

[21] Appl. No.: 684,801

[22] Filed: Apr. 15, 1991

[30] Foreign Application Priority Data

May 28, 1990 [IT] Italy .............................. 67387 A/90

[51] Int. Cl.⁵ .......................................... G01N 21/00
[52] U.S. Cl. .................................. 250/359.1; 250/341; 250/223 R; 209/524; 356/385; 378/54
[58] Field of Search ............. 250/341, 359.1, 223 R, 250/347, 360.1, 561; 209/576, 572, 588, 511, 524, 536; 378/208, 54, 57, 58; 356/385

[56] References Cited

U.S. PATENT DOCUMENTS

| | | | |
|---|---|---|---|
| 2,171,362 | 8/1939 | Gullikesen | 250/223 R |
| 3,485,339 | 12/1969 | Miller et al. | 250/223 R |
| 3,541,332 | 11/1970 | Brunton | 378/54 |
| 3,541,339 | 11/1970 | John et al. | 250/208.4 |
| 4,020,346 | 4/1977 | Dennis | 378/57 |
| 4,086,496 | 4/1978 | Berry | 250/561 |
| 4,239,969 | 12/1980 | Haas et al. | 378/57 |
| 4,366,382 | 12/1982 | Kotowski | 378/99 |
| 4,864,122 | 9/1989 | Masaaki et al. | 250/223 R |
| 5,040,199 | 8/1991 | Stein | 378/54 |
| 5,044,002 | 8/1991 | Stein | 378/57 |

Primary Examiner—Carolyn E. Fields
Assistant Examiner—Drew A. Dunn
Attorney, Agent, or Firm—Evenson, Wands, Edwards, Lenahan & McKeown

[57] ABSTRACT

The invention is preferably used for detecting the positions of articles made to advance on a belt conveyor or the like. The device comprises a radiation emitter located so that its radiation is propagated through the conveyor belt. The detection is preferably effected by a pair of detectors arranged adjacent each other so as to generate a signal which indicates that two articles are spaced apart only when both of the detectors are struck simultaneously by the radiation generated by the emitter.

19 Claims, 2 Drawing Sheets

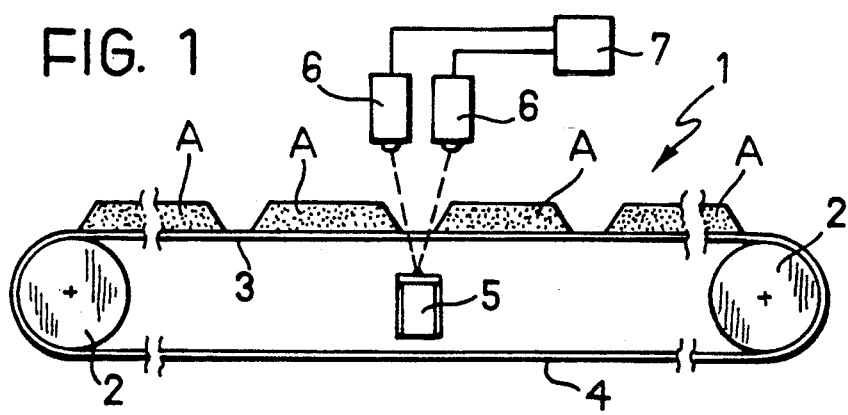
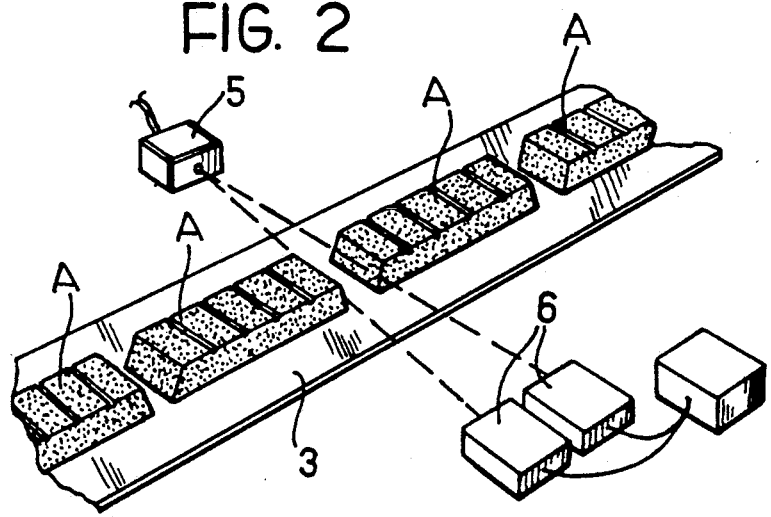
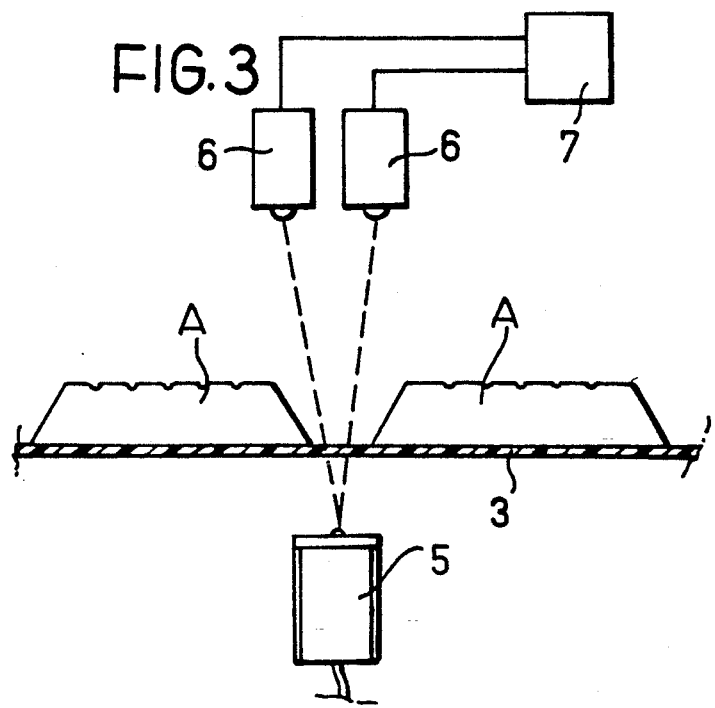

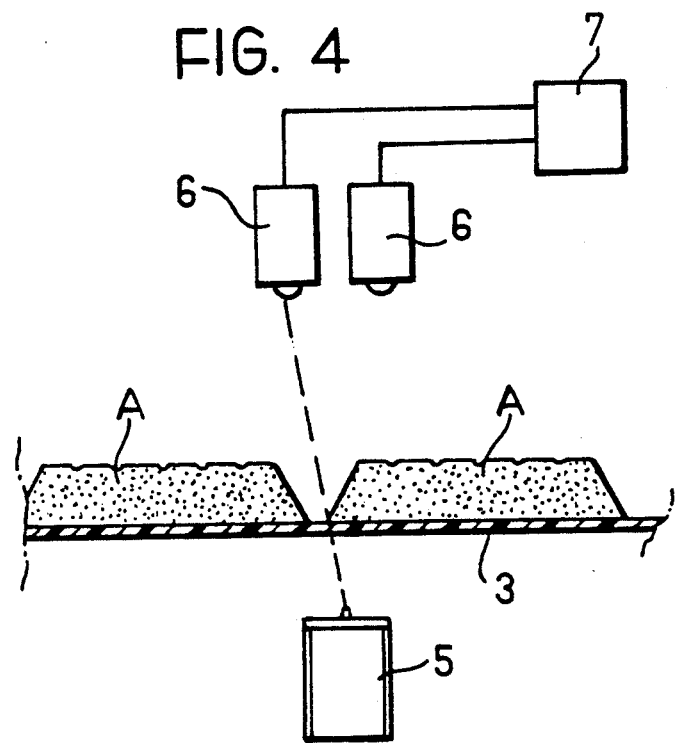
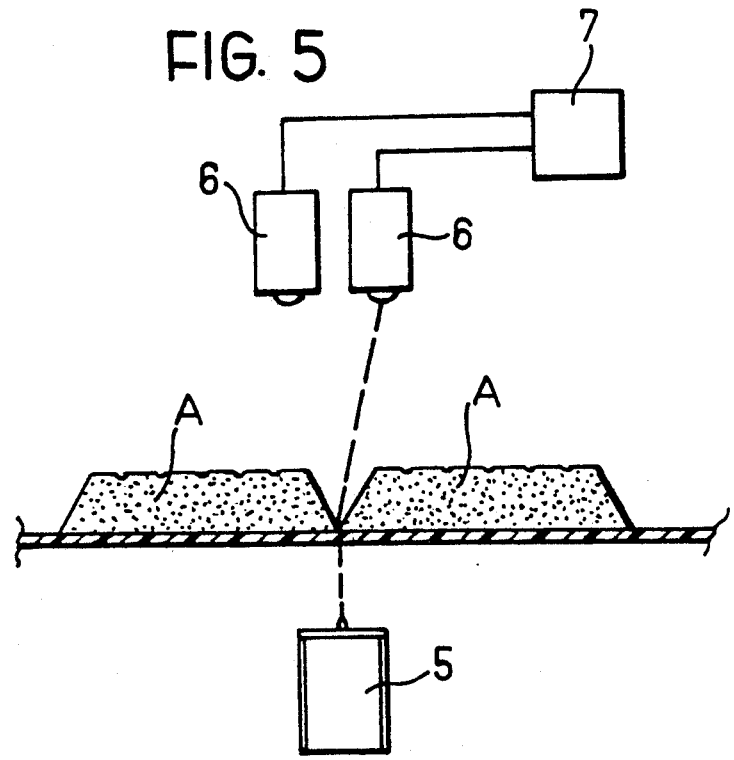

METHOD AND APPARATUS FOR DETECTING THE POSITIONS OF ARTICLES TRANSPORTED ON A CONVEYOR, PARTICULARLY FOR AUTOMATIC PACKAGING PLANTS

BACKGROUND AND SUMMARY OF THE INVENTION

The present invention relates in general to the detection of the positions of articles transported on a conveyor. The invention has been developed with particular attention to the detection of the relative positions of articles transported on a conveyor in an automatic packaging plant. It may, however, also be applied in other fields.

In general, when there is a continuous or substantially continuous flow of articles on a conveyor, the need may arise to detect, in one or more positions on the conveyor path, whether the advancing articles are spaced apart or in contact with each other or almost in contact, that is to say, in a condition in which a certain accumulation or queue has formed or is tending to form.

In order to ensure that the plant operates well, it is essential to detect this condition accurately, for example, to prevent the creation of excessive longitudinal pressure in the advancing line of articles.

In many cases (and particularly in the typical situations of application to which reference will be made below, that is, in the automatic packaging of food products such as chocolate bars, chocolate-coated wafer biscuits and like products) the articles in question tend to be rather delicate whereby longitudinal pressure in the line of articles would cause damage to the products themselves.

In a conventional solution in the automatic packaging and transportation industry, the articles in question are advanced in a continuous or substantially continuous flow on conveyors such as endless belts each of which has an upper pass for transporting the articles and a lower return pass.

In this connection, the use of optical gates or barriers to detect the relative positions of the articles (that is, whether they are advancing spaced apart or in contact with each other or almost in contact) is known.

It is known to use various operative solutions for this purpose, amongst these may be mentioned:

optical gates each constituted by a light emitter (an LED or the like) and a photoelectric receiver (a photodiode or a phototransistor) situated on opposite sides of the flow of products so that the beam of light travels from the emitter to the receiver in a direction generally transverse (perpendicular or oblique to) the direction of advance of the articles and is intercepted periodically by the passage of the articles so that a permanent or almost permanent interruption of the beam is indicative of the condition in which they are in contact or almost in contact;

optical gates in which the emitter and the receiver are situated on one side only of the flow of products whilst a reflective screen is situated on the opposite side for returning the radiation produced by the emitter to the receiver: again in this case, the transit of the articles obstructs the path of propagation of the light beam and results in a disturbance of the signal output by the receiver which can be used to detect whether the products are spaced-apart or are packed closely together or near to each other, and solutions which provide for the use of an emitter-receiver pair situated on one side of the flow of articles with an associated optical device whose focus is adjusted so as to coincide approximately with the surface of the advancing articles; in this case, a reflective element is not provided on the opposite side of the flow: the detection by the photodetector is in this case based on the different levels assumed by the photodetection signal according to whether the radiation generated by the emitter is reflected (or, more correctly, scattered back) by the surfaces of the advancing articles in correspondence with the focus of the optical device or by the background which is generally constituted by the surface of the conveyor or by the region behind it.

All three of the solutions described above have advantages and disadvantages.

The first two solutions (the emitter-detector situated on opposite sides or the emitter-detector on one side with a reflective element on the opposite side) are very well suited to horizontal detection, that is, with the path of propagation of the radiation of the light gate extending in a plane parallel to, or almost parallel to, the plane on which the products advance.

In the case of products advancing between lateral containment guides, however, it is necessary to provide apertures for the passage of the light.

In the case of articles having a certain height, this does not create any particular problem since the guides can be formed so as to leave a horizontal strip open between their lower edges and the surface of the conveyor so that the optical gate effects its detection in correspondence with the bases of the products. If the products are not very high, however, (one thinks, for example, of chocolate-coated wafer biscuits) it is necessary to provide windows in the lateral containment guides; but these windows may cause the products to jam, with very harmful results.

In any case, regardless of whether or not the guides are present, lateral or horizontal detection is very difficult with articles which are not very tall since even very small vertical movements may distort the results of the detection quite significantly.

The use of the third solution (an emitter-detector unit with optical focusing devices) resolves the problems described above by detecting vertically, that is, with the detector unit situated above the flow of articles advancing on the conveyor. This solution suffers, however, from the fact that the reflection (or backscattering) of the optical radiation on which its operation is based is particularly critical.

In particular, and above all in application to food products, the reflection or backscattering characteristics of the surfaces of the articles transported on the conveyor may differ substantially both in absolute terms and from one article to another.

Still with reference to the case of chocolate-coated wafer biscuits, it can readily be understood that the surface of the chocolate coating is not at all flat and uniform and usually has unpredictable ripples and wrinkles. Moreover, the Applicant has found that even small changes in the nature of the coating (a change from sweet chocolate to bitter chocolate) can cause very marked changes in the backscattering characteristics of the surface of the product.

The foregoing also applies essentially to backscattering by the surrounding area or the surface of the conveyor.

In some situations, for example, backscattering by an internal surface of the housing of the machine or by an object placed accidentally on the ground beneath the machine, even at a certain distance from the optical unit, may be confused with backscattering from the surface of the product in the focal plane of the optical device.

The same is also true of the surface of the conveyor. In this respect, it should also be remembered that many food products are quite dark in colour and have quite uneven surfaces (which thus tend not to be very reflective) whilst the current standards for the manufacture of machines and conveyors generally dictate the use of light colours (typically white) or materials (for example plastics materials for the food industry) which are usually quite smooth and reflective.

This situation is further complicated by the fact that the conveyor surface may accidentally become soiled by traces of the product (for example smears of chocolate) which can further alter the backscattering characteristics of the support.

The object of the present invention is therefore to provide a method and apparatus for detecting the positions of articles transported on a conveyor which avoids the problems of the known solutions referred to above.

This object is achieved according to the present invention by positioning the radiation emitter and detector units along an axis which is perpendicular to the plane of the conveyor belt, and by use of a detector unit which includes a pair of detectors which are offset from each other in the direction of travel of the conveyor belt.

Other objects, advantages and novel features of the present invention will become apparent form the following detailed description of the invention when considered in conjunction with the accompanying drawings.

BRIEF DESCRIPTION OF THE DRAWINGS

FIG. 1 is a schematic side-elevational view of the apparatus for transporting articles, formed in accordance with the invention, and FIG. 2 is a schematic perspective view of a possible variant of the invention, and FIGS. 3 to 5 show three possible situations in the use of apparatus of the invention, with reference to the specific embodiment of FIG. 1.

DETAILED DESCRIPTION OF THE DRAWINGS

For completeness, it should also be remembered that the used in the present description and in the claims which follow should not be understood as being limited strictly to the visible range of radiation; in fact it is current (and in many ways the predominant) practice in the context of the invention, to use radiation in the infrared range or in other ranges. The present invention should not, therefore, be understood in any way as limited to the use of radiation in the visible light range.

In FIG. 1, a conveyor of the type currently known as an endless conveyor or transporter is generally indicated 1. This is a conveyor which is widely used, for example, in the automatic packaging industry. It consists essentially of a belt of flexible material (for example a polyester fabric covered on one or both faces with a continuous layer of PVC or a plastics material permitted for contact with food products) formed in a closed loop so as to pass around end transmission rollers 2, one of which is rotated by drive means (not shown) according to principles widely known in the art.

The belt thus forms an upper horizontal pass 3 and a lower return pass 4. The upper pass 3 moves (from left to right with reference to the situation shown in FIG. 1) so as to transport articles A, such as food products (chocolate bars, chocolate-coated wafer biscuits, etc) in a continuous or substantially continuous flow.

By way of reference, it will be assumed that generally flat or elongate articles A are involved and that their end edges (front and rear with respect to their direction of advance) are not rigidly defined in a vertical sense but are generally inclined or rounded. As will become clearer from the following, in practice this means that, when the articles A in question move towards each other so as to become packed closely together, they define peripheral zones of mutual contact which are usually quite uneven and form upper and/or lower grooves or like regions in which the overall thickness of the flow of articles, seen as a continuous entity, is reduced locally.

Situations of the type specified above, as well as the corresponding devices, are widely known in the art and do not therefore need to be explained further herein.

It is also known that, in one or more regions of the line of advance, it is necessary to detect whether the articles A are spaced apart (possibly by detecting the magnitude of their spacing) or are packed closely together, or near to each other (that is in conditions in which the distance between the articles tends to a minimum).

In a conventional, prior-art approach, the conveyor 1 and, more precisely, the material of the belt whose upper pass 3 constitutes the conveyor pass for the articles A, was regarded as an opaque object, impermeable to light (this term also including, as already stated above, radiation in frequency ranges outside the visible range). This has meant that, hitherto, the use of optical gates with radiation propagation paths which pass through the flow of articles (the first two technical solutions mentioned in the introductory part of the present description) has in fact been limited to solutions which detect horizontally, with the exclusion of vertical detection (which hitherto has been limited to the use of emitter-detector units with associated optical focusing devices according to the third solution mentioned in the introduction to the present description).

A first aspect of the present invention is based on a recognition of the fact that the most recent generations of emitter units of optical gates (photocells) have emission characteristics (the power of the radiation emitted and its wavelength) which, possibly taken in combination with the sensitivities of the respective photodetectors, enable the light radiation (typically in the infrared range) to be propagated even through the material of the conveyor belt.

In other words, the radiation of the emitter-receiver unit used to constitute the optical gate can "pierce" the material constituting the belt although it undergoes a certain degree of attenuation by the belt.

In this connection, the Applicant has found that, when used with an emitter-receiver distance of the order of tens of centimeters (for example, 10–20 cm.) emitter-receiver systems such as the WS/WE 6 system produced by the company Erwin Sick (Germany) can propagate radiation through the belts currently used in the automatic packaging industry, including the thickest, without the belt adversely affecting the precision of the detection, even though it contributes to a certain attenuation of the optical signal.

In practice, the attenuation of the radiation by the material of the belt is much less than that caused by the material constituting the articles A advancing on the conveyor when they intercept the radiation of the optical gate.

This means that, in practice, to the detector unit the belt 3 in fact behaves like a transparent material on which the generally opaque articles A advance.

The recognition of this fact thus enables detection to be carried out according to the solution shown in FIG. 1—with the light radiation emitter 5 5) situated under the upper pass of the belt 3 whilst the photodetector (preferably a pair of photodetectors 6, as will be seen below) is situated above, or vice versa (emitter 5 above and receiver 6 below).

In other words, this first aspect of the invention is based on the recognition of the wholly unexpected fact that the same means which up to now have been used for horizontal detection can be used for vertical detection.

In any case, the fact that the belt is interposed in the path of propagation of the light does not appreciably affect the precision of the detection: to the detector, the articles A appear as a series of shadows moving on a light background (that is, on the belt which is seen as a substantially transparent element). The observation of the alternating dark and light regions caused by the movement of the articles A and of the durations (in time) of the light or dark regions, with the consequent generation of detection signals at different levels, enables the distances between the articles A to be derived (from well known principles which do not need to be recited herein).

In particular, when, as a result of a change in the transportation conditions, the articles A close together and tend to pack against each other with their opposite ends in contact, the radiation propagated towards the detector tends to be intercepted by the articles A for longer and longer periods. This goes on until a situation is reached in which the articles A are packed closely together and the propagation of the radiation to the detector is actually stopped since there are no longer any windows, gaps or spaces between successive articles A through which the radiation can be propagated towards the detector.

The Applicant has observed, however, that, in practice, this situation tends to be reached only approximately for various reasons.

in the first place, the facing sides (front and rear respectively with respect to the direction of advance) of successive articles A in the flow are hardly ever exactly straight due, for example, to unevenness in the chocolate coating or simply because the edges are rounded, as in the case of biscuits;

in the second place, particularly with articles A which have trapezoidal vertical profiles such as that shown in FIG. 1 (chocolate bars and the like), the gradual reduction in the depths of the articles A in their front and rear end regions means that, even when these regions are packed closely together and, seen in plan, are substantially rectilinear in shape, the radiation of the optical gate is not greatly attenuated by the material of the articles A so that radiation of a certain intensity continues to reach the photodetector and two successive articles A which are actually in contact appear to be spaced apart; this situation is manifested very clearly with light gates operating with infrared radiation which can be propagated even through a certain thickness of a body which is opaque to visible radiation.

The phenomena described above, particularly in combination, may give rise to very critical situations.

The fact that the detector continues to see as spaced apart successive articles A which are actually already in contact with each other may lead the automatic control of the conveyor system to intervene to try to bring the articles A closer together (for example by slowing a further conveyor belt situated downstream or by accelerating the movement of an upstream conveyor), with the risk of too much longitudinal pressure being applied to line of advancing articles A, which could damage the articles or even cause the line to curve, with a consequent loss of control of the flow.

A further aspect of the present invention is based on a recognition of the fact that the risk described above can be avoided reliably by the detection of the radiation generated by the emitter 5 with two detector elements 6 arranged side-by-side, that is, in cascade with each other in the arrangement shown schematically in the drawings.

In particular, the solution of FIG. 1 (which relates to vertical detection with the radiation of the optical gate passing through the material of the belt 3) provides for the use of an emitter 5 (for example a Sick WS 6 emitter) beneath the belt 3 in conjunction with two photodetectors 6 (for example two Sick WS 6 photodetectors) above the belt 3.

The variant of FIG. 2 (which relates to horizontal detection in which the radiation does not pass through the belt 3) provides for the use of an emitter 5 on one side of the belt 3 and two photodetectors 6 on the opposite side.

Naturally, as stated above, the positions of the emitter 5 and the detectors 6 can be interchanged (for example, in the solution of FIG. 1, by the location of the emitter 5 above the belt 3 and the detectors 6 beneath the belt). Again, although FIGS. 1 and 2 relate explicitly to the use of an emitter 5 on one side of the flow of articles A and two photodetectors 6 on the opposite side, the invention also applies to situations (not shown explicitly) in which the emitter and the detectors are all situated on one side of the flow of articles A, either with the provision of a screen on the opposite side for reflecting the radiation emitted by the emitter towards the detectors or with an optical focusing device whose focus is adjusted so as coincide approximately with the surfaces of the advancing articles A.

Finally, whilst being functionally separate, the two detector units 6 could in fact be integrated in a single device. All the variants mentioned above are therefore included in the scope of the invention.

As regards dimensions (still with reference to the use of the Sick components WS/WE 6) a distance of the order of 10 cm between the emitter 5 and the detectors 6 may be considered. In this case, the detectors 6 are placed side-by-side, approximately 20 mm apart (with reference to the photosensitive regions), that is, on opposite sides of the central axis of propagation of the radiation emitted by the emitter 5 (the principal axis of the radiation diagram), at distances of approximately 10 mm therefrom.

More particularly, it is known that the radiation diagram is usually generally "onion"-shaped and can be modified with the use of shaping diaphragms supplied as accessories for the optical gate components.

This applies both to an arrangement (that shown in the drawings) in which the direction of propagation of the radiation (in both directions) is approximately perpendicular to the direction of advance of the articles A and in situations in which (for various reasons known to an expert in the art) a direction of propagation inclined or oblique to the direction of advance of the articles A is selected.

The use of two photodetector elements 6 enables a logic to be used to determine the separation of the articles A on the basis that two articles A are regarded as being separated or spaced apart if, and only if, both photodetectors 6 of the pair are struck simultaneously by the radiation generated by the emitter 5.

The various operative situations which may occur are therefore, essentially, those shown schematically in FIGS. 3 to 5.

When two adjacent articles A are actually spaced apart, the radiation generated by the emitter 5 reaches both the detectors 6 simultaneously (passing through the belt or mat 3 if necessary) (FIG. 3).

When the adjacent articles A come closer together, narrowing the region of separation or gap between them (FIG. 4), the possibility of both of the detectors 6 being reached by the radiation generated by the emitter 5 at the same moment gradually reduces (account being taken, in this connection, of the fact that the radiation diagram of the emitter 5 is generally symmetrical about the principal axis relative to which the two photodetectors 6 are mirror imaged).

In particular, if account is taken of the fact that the two detectors 6 are offset (that is spaced apart) in the direction of advance of the articles A, it is practically certain that, when successive articles A are in contact with each other (FIG. 5), whilst the radiation generated by the emitter 5 may be able to leak through gaps left between the products A or may even be able pass through the thinnest parts of the articles with little attenuation, it will succeed at most in reaching one detector 6 at a time not both detectors simultaneously.

It is possible to discriminate reliably between a situation in which the articles A are (still) spaced apart and a situation in which they are brought practically into contact with each other from the detection signals generated by the detectors 6 with the aid of an elementary logic operation which can easily be carried out (according to widely known criteria) by a processing module 7 which receives the signals output by the photodetectors 6.

This logic operation may either be a conjunction operation (AND) or a logic sum operation (OR) according to whether it is based on signals indicative of the presence or of the absence of the articles; in fact, it can be concluded that the articles are separated when both of the photodetectors 6 are illuminated simultaneously by the radiation generated by the emitter 5 (conjunction) or, in a complementary manner, it may be concluded that the articles A are in contact with each other when one or other or alternatively both of the detectors 6 are obscured continuously by the flow of articles A (logical sum). Naturally, other ways of processing the signals (within the capabilities of an expert in the art) are possible.

The optical gate can be calibrated precisely by adjustment of the sensitivity thresholds of the detectors 6 (which are usually pre-arranged for this purpose for example, the detector WE 6 produced by Sick has two external sensitivity adjusters which operate on coarse and fine scales respectively) so that, for example, the detection device considers successive articles A to be in contact when they are spaced apart by a distance of less than a minimum threshold (for example 2 mm).

For this purpose, with reference to the arrangement of FIG. 1, it is possible to use a gauge constituted by a plate of metal (or another material which absorbs the radiation of the gate) formed with a slot whose width is equal to the reference threshold (for example a slot 2 mm wide). The gauge in question can be passed through the optical gate 5, 6 in the direction of advance of the articles A, the sensitivity thresholds of both of the detectors 6 being adjusted so that they are not near the threshold at which the activation signal is emitted (radiation received) when the gauge is passed in front of them. When adjusted in this manner, the detectors 6 will supply signals simultaneously for articles A which are spaced apart by a distance just greater than the threshold defined by the slot. This adjustment can be effected easily, even by an operator who is not particularly skilled, since the photodetectors in question are usually provided with light indicators (typically, three leds of different colours, for example, red, yellow and green) on their outer casings, which can identify clearly the extreme conditions in which the detector sees a signal or considers itself to be obscured (the green and red indicators), as well as an intermediate, doubtful condition, that is a condition near a threshold (yellow indicator).

Naturally, the mounting arrangement with two detectors 6 as described above can be used for detection (vertical or horizontal) both along the conveyor pass 3 of the conveyor belt and in correspondence with the transition regions between several conveyor belts arranged in cascade.

Particularly in this latter situation of use (that is when detection is effected vertically and the attenuating effect of the belt 3 is less), the Applicant has noticed that it can be advantageous to place dimming elements (for example photographic films exposed and developed to a shade of grey) in front of the photosensitive surfaces of the detectors 6 mentioned above so as to reduce the intensity of the incident radiation slightly. The Applicant has found that this measure renders the detection more reliable.

Whilst not wishing to be bound to any particular theory in this connection, the Applicant has reason to believe that the use of these masking or dimming means causes the photodetector to operate in a region in which there is a wider variation in the photoelectrical signals generated in the photodetector for a given relative variation in the intensity of the radiation incident from the exterior (and hence a situation in which the photoelectric signal is more dynamic) than when the incident radiation strikes the photosensitive surface of the detector directly, without the interposition of the masking means.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Apparatus for detecting positions of articles advancing on a conveyor comprising:
   generator means for generating radiation on a path which is interrupted selectively by said articles;
   detector means for detecting interruption of said radiation by said article, said detector means comprising at least two detection units adjacent each other in a direction of advance of said articles, said detection units being arranged such that radiation produced by said generator means reaches said detection units simultaneously only when a predetermined separation exists between said articles advancing on said conveyor;
   said detector means comprising logic processing means responsive to signals generated by said detection units, for generating a signal which indicates that successive advancing articles are separated from each other on said conveyor by at least said predetermined separation, only when said detection units simultaneously generate signals indicative of passage of radiation through a path of advance of said articles, without interruption by said articles.

2. Apparatus according to claim 1, wherein said generator means are situated on one side of said conveyor and said detector means are situated on an opposite side of said conveyor.

3. Apparatus according to claim 1, wherein said generator means and said detector means are situated on one side only of said conveyor, and said apparatus includes means for returning the radiation produced by said generator means to said detector means.

4. Apparatus according to claim 3, wherein said means for returning the radiation produced by the generator means to the detector means are constituted by the articles themselves, and wherein said generator means and said detector means carry associated optical devices focused substantially near surfaces of the articles.

5. Apparatus according to claim 1, wherein said detection units are separated by a distance of the order of approximately 20 mm.

6. Apparatus according to claim 1, wherein said detection units are arranged symmetrically with respect to a principal axis of propagation of the radiation produced by said generator means.

7. Apparatus according to claim 1, wherein said generator means and said detector means define a radiation propagation path which is approximately 10-20 cm long.

8. Apparatus according to claim 1, wherein said detection units are integrated in one device.

9. Apparatus according to claim 1, wherein said detector means have radiation-sensitive elements and associated dimming means for reducing intensity of radiation striking said elements.

10. Apparatus according to claim 9, wherein said dimming means are constituted by a film of a selectively predetermined shade of grey.

11. Apparatus according to claim 1, wherein:
    said radiation is capable of penetrating material of said conveyor; and
    said generator means is positioned on a first side of a plane of said conveyor and said detector means is positioned on an opposite side of said plane, said generator means and said detector means being oriented so that radiation generated by said generator means propagates along a path which penetrates said material of said conveyor in an area traversed by said articles so that it can impinge on said detector units.

12. Apparatus according to claim 11, wherein said path is approximately perpendicular to the plane of said conveyor transport.

13. Apparatus according to claim 11, wherein said radiation is optical radiation.

14. Apparatus according to claim 13, wherein said radiation is infrared radiation.

15. Method of detecting positions of articles advancing on a conveyor, comprising the steps of:
    generating radiation on a path which is interrupted selectively by said articles;
    detecting said radiation and interruption of said radiation by said articles at two points which are adjacent each other in a direction of advance of said articles, said points being separated from each other by a distance such that said radiation reaches both of said points simultaneously only when a predetermined separation exists between said articles advancing on said conveyor; and
    generating a signal indicating that successive articles on said conveyor are separated form each other by said predetermined separation, only when said radiation is detected simultaneously at both of said points, indicative of passage of radiation through a path of advance of said articles without interruption by said articles.

16. Method according to claim 15, wherein:
    said radiation is capable of penetrating material of said conveyor and is directed on a path which penetrates the material of said conveyor in an area traversed by said articles advancing on said conveyor, said radiation being detected at a point i said path after it passes through said material of said conveyor.

17. Method according to claim 16, wherein said path of said radiation is substantially perpendicular to a plane of said conveyor.

18. Method according to claim 17, wherein said radiation is optical radiation.

19. Method according to claim 18, wherein said radiation is infrared radiation.

* * * * *